United States Patent [19]

Miyano

[11] Patent Number: 4,984,878
[45] Date of Patent: Jan. 15, 1991

[54] OJECTIVE LENS FOR ENDOSCOPE

[75] Inventor: Hitoshi Miyano, Omiya, Japan

[73] Assignee: Fuji Photo Optical Co., Ltd., Omiya, Japan

[21] Appl. No.: 390,758

[22] Filed: Aug. 8, 1989

[30] Foreign Application Priority Data

Sep. 29, 1988 [JP] Japan .................. 63-242441
Apr. 5, 1989 [JP] Japan .................... 1-84719

[51] Int. Cl.$^5$ .................... G02B 9/34; G02B 21/02
[52] U.S. Cl. .................... 350/469; 350/414
[58] Field of Search .................. 350/414, 469

[56] References Cited

U.S. PATENT DOCUMENTS 4,674,844  6/1987  Nishioka et al. ............ 350/469
4,806,001  2/1989  Okabe et al. ............... 350/469 X Primary Examiner—Scott J. Sugarman Attorney, Agent, or Firm—Oblon, Spivak, McClelland, Maier & Neustadt

[57] ABSTRACT

An objective lens particularly suitable for use in endoscope, employing a lens system which is composed of four single lenses, namely, composed of, from the object side, a first lens $L_1$ consisting of a negative lens having the concave surface thereof on the object side, a second lens $L_2$ consisting of a positive lens having a surface of smaller radius of curvature disposed on the object side, a third lens $L_3$ consisting of a positive lens having a surface of smaller radius of curvature on the image side, and a fourth lens $L_4$ consisting of a positive lens. In this lens construction, the respective lenses $L_1$ to $L_4$ are adapted to satisfy the conditions of $n_1 > 1.70$, $\gamma_1 > 40.0$, $\gamma_3 < 42.5$, $n_5 > 1.60$, $\gamma_5 > 50.0$, $n_7 > 1.60$, and $\gamma_7 > 50.0$ (where $n_1$, $n_5$ and $n_7$ are refractive indices of the first lens $L_1$, third lens $L_3$ and fourth lens $L_4$ relative to line d, respectively, and $\gamma_1$, $\gamma_3$, $\gamma_5$ and $\gamma_7$ are Abbe's numbers of the first to fourth lenses $L_1$ and $L_4$, respectively.)

7 Claims, 7 Drawing Sheets

SPHERICAL ABERRATION

FIELD CURVATURE

DISTORTION

LATERAL CHROMATIC ABERRATION

SPHERICAL ABERRATION   FIELD CURVATURE   DISTORTION   LATERAL CHROMATIC ABERRATION

SPHERICAL ABERRATION

FIELD CURVATURE

DISTORTION

LATERAL CHROMATIC ABERRATION

SPHERICAL ABERRATION  FIELD CURVATURE  DISTORTION  LATERAL CHROMATIC ABERRATION

SPHERICAL ABERRATION | FIELD CURVATURE | DISTORTION | LATERAL CHROMATIC ABERRATION

SPHERICAL ABERRATION

FIELD CURVATURE

DISTORTION

LATERAL CHROMATIC ABERRATION

SPHERICAL ABERRATION | FIELD CURVATURE | DISTORTION | LATERAL CHROMATIC ABERRATION

OJECTIVE LENS FOR ENDOSCOPE

BACKGROUND OF THE INVENTION

1. Field of the Invention

This invention relates to an objective lens construction particularly suitable for use in endoscopes.

2. Prior Art

Figure 11:
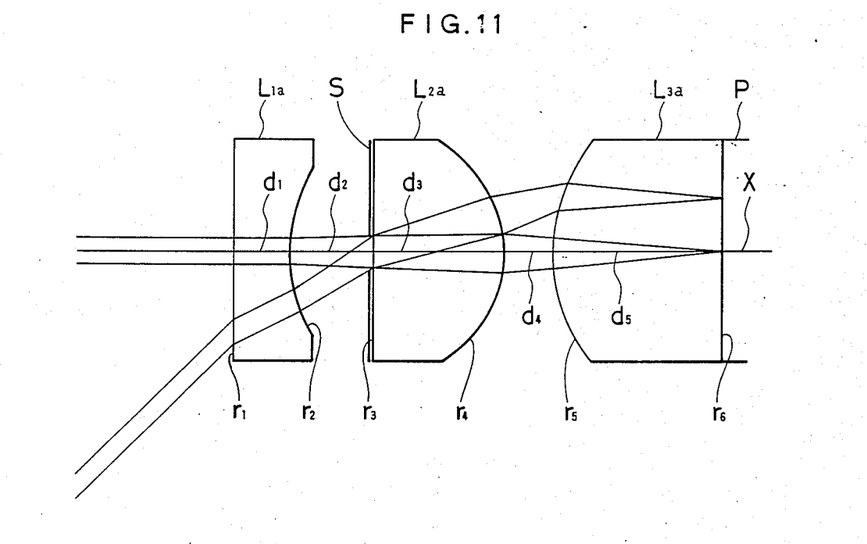
FIG. 11 is a schematic illustration of a conventional objective lens construction for endoscope.

The endoscopes such as bronchoscopes which are inserted into the bronchial tube for a medical examination or for a therapeutic purpose are required to be as thin as possible at least in that portion which is to be inserted into the body. Likewise, the objective lens to be mounted in an observation window at the fore end of the thin insert portion of an endoscope is required to have as small a size as possible and to be of a wide angle. In order to meet these requirements, there has thus far been adopted a lens construction as shown in FIG. 11.

As clear therefrom, the conventional lens construction is composed of three lens elements arranged in three groups, namely, a series of three juxtaposed lens elements consisting of, from the object side, a first lens element $L_{1a}$ consisting of a plano-concave negative lens having a plane surface disposed on the object side and a concave surface on the image side, a second lens element $L_{2a}$ consisting of a plano-convex positive lens having a plane surface on the object side and a convex surface on the image side, and a third lens element $L_{3a}$ consisting of a plano-convex lens having a convex surface on the object side and a plane surface on the image side. A stop S is interposed between the first and second lens elements $L_{1a}$ and $L_{2a}$. Located on the image side of the third lens element $L_{3a}$ is the incident end of an image guide consisting of a bundle of optical fiber which transfers images of objects under observation or a solid image pick-up element like CCD which picks up images of objects under observation.

Figure 12:
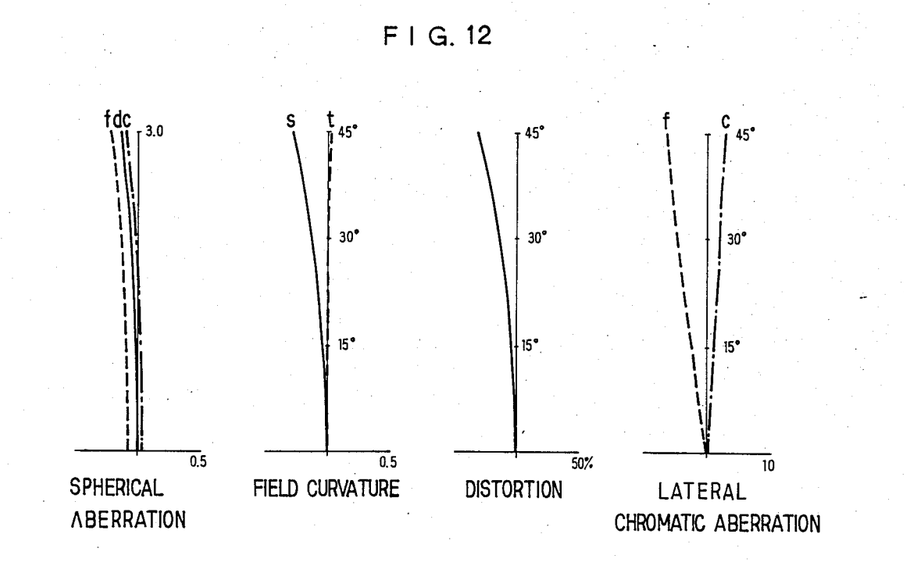
FIG. 12 shows aberration curve diagrams of the conventional lens construction of FIG. 11.

Using expressions by the following symbols, m: surface numbers counted successively from the object side;

$r_1, r_2, \ldots r_6$: radii of curvature of respective lenses;
$d_1, d_2, \ldots d_5$: lens thicknesses or airspaces;
$n_1, n_3, n_5$: refractive indices relative to line d;
$\gamma_1, \gamma_3, \gamma_5$: Abbe's numbers of respective lenses;
f: focal length of the total lens system; and
$2\omega$: angle of view the aberration characteristics curves as shown in the diagrams of FIG. 12 are obtained when

| m | r | d | n | ν |
|---|---|---|---|---|
| 1 | ∞ | 0.362 | 1.55920 | 53.9 |
| 2 | 1.090 | 0.517 | | |
| 3 | ∞ | 0.828 | 1.88300 | 41.0 |
| 4 | −0.805 | 0.310 | | |
| 5 | 1.150 | 1.075 | 1.88300 | 41.0 |
| 6 | ∞ | | | |
| f = 0.5 | | field angle 2ω = 90° | | |

As clear from the aberration diagrams, monochromatic light aberrations such as spherical aberration, field curvature and distortion are corrected sufficiently, but lateral chromatic aberration still remains in an undesirably large degree, lowering the resolution of the lens system. This lateral chromatic aberration becomes greater especially in case of the endoscope which employs a wide angle lens system for the purpose of capturing in a wide view angle the images at a close distance from the observation window of the inserted instrument during observation.

Figure 13:
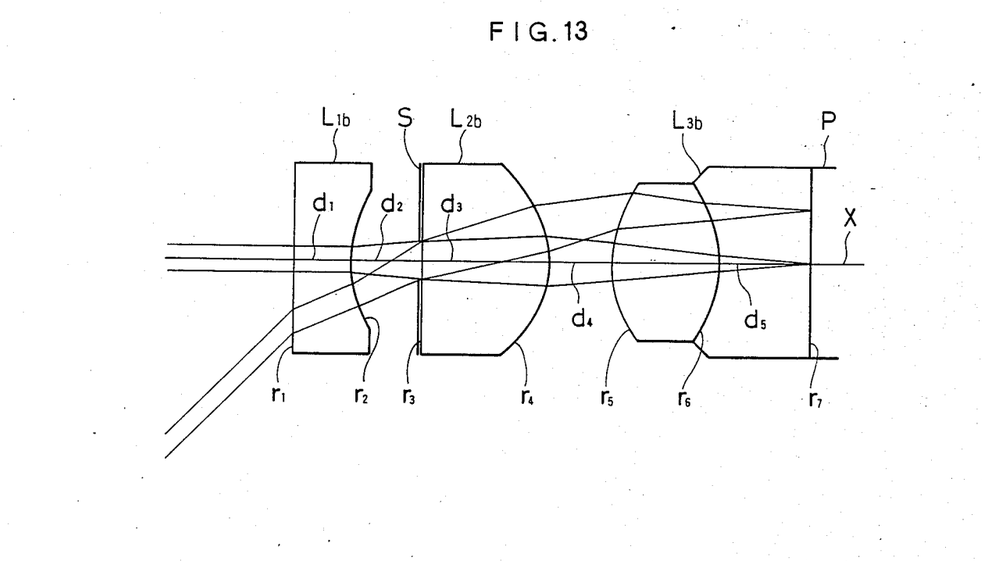
FIG. 13 is a schematic illustration of another conventional objective lens construction for endoscope.
Figure 14:
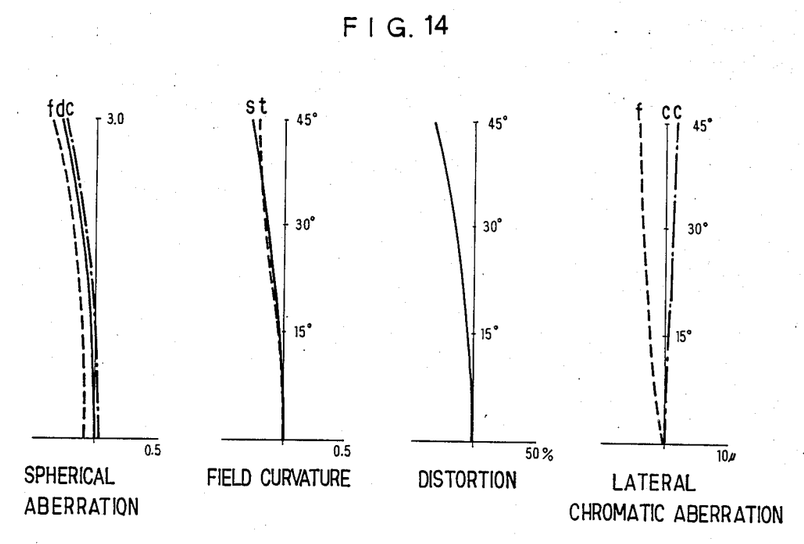
FIG. 14 shows aberration curve diagrams of the conventional lens construction of FIG. 13.

In this regard, it is known that the chromatic aberration can be improved by the use of an achromatizing cemented lens as shown at $L_{3b}$ in FIG. 13. Namely, there has been known a lens construction where an achromatic cemented lens $L_{3b}$ is located on the image side of a plano-convex lens of the second lens element $L_{2b}$, interposing a stop S between the second lens element $L_{2b}$ and a plano-concave lens of the first lens element $L_{1b}$ which is located on the object side. This lens construction where

| m | r | d | n | ν |
|---|---|---|---|---|
| 1 | ∞ | 0.357 | 1.81550 | 44.4 |
| 2 | 0.794 | 0.469 | | |
| 3 | ∞ | 0.816 | 1.77250 | 49.6 |
| 4 | −0.729 | 0.398 | | |
| 5 | 0.85 | 0.684 | 1.60738 | 56.7 |
| 6 | −0.85 | 0.565 | 1.80518 | 25.4 |
| 7 | ∞ | | | |

(m, r, d, n and ν have the same meaning as defined above) can favorably correct the various aberrations including the lateral chromatic aberration.

As mentioned hereinbefore, the objective lens for endoscope is required to use a wide angle lens system and at the same time to be as small as possible in size of the lens system as a whole. However, the achromatizing cemented lens $L_{3b}$ requires strict alignment of the optical axes of two lens elements when joining them together, as a result necessitating to combine a concave lens element with a convex lens element which has a smaller diameter than the concave lens element. Needless to say, it is extremely difficult to polish lens elements of such a small diameter. It is also extremely difficult to discriminate the difference in radius of curvature between the opposite surfaces of a convex lens element to be joined. Therefore, there have to be employed lens elements with the same radius of curvature on the opposite surfaces in order to preclude errors in assembling process. This imposes a great restriction on lens designs.

SUMMARY OF THE INVENTION

In view of the foregoing situations, the present invention has as its object the provision of an objective lens for endoscope, which can correct lateral chromatic aberration in a satisfactory manner to ensure improved resolution without using an achromatizing cemented lens.

It is another object of the invention to provide an objective lens for endoscope, which is extremely small in size and which facilitates lens polishing or machining processes.

In accordance with the present invention, these objects are achieved by a lens system which is composed of four single lenses designated, from the object side, as first, second, third and fourth single lenses, and wherein:

the first lens $L_1$ consists of a negative lens having a concave surface thereof disposed on the image side;

the second lens $L_2$ consists of a positive lens having a surface of smaller radius of curvature disposed on the object side;

the third lens $L_3$ consists of a positive lens having a surface of smaller radius of curvature disposed on the image side; and the fourth lens $L_4$ consists of a positive lens;

the first to fourth lenses being arranged to satisfy the conditions of (1) $n_1 > 1.70$, $\gamma_1 > 40.0$, (2) $\gamma_3 < 42.5$, (3) $n_5 > 1.60$, $\gamma_5 > 50.0$ and (4) $n_7 > 1.60$, $\gamma_7 > 50.0$ where $n_1$, $n_5$ and $n_7$ are refractive indices of the first lens $L_1$, third lens $L_3$ and fourth lens $L_4$ relative to line d, and $\gamma_1$, $\gamma_3$, $\gamma_7$ are Abbe's numbers of the first lens $L_1$, second lens $L_2$, third lens $L_3$ and fourth lens $L_4$, respectively.

BRIEF DESCRIPTION OF THE DRAWINGS

The above and other objects, features and advantages of the invention will become apparent from the following description, taken in conjunction with the accompanying drawings in which.

DESCRIPTION OF PREFERRED EMBODIMENTS

Hereafter, the invention is described particularly by way of preferred embodiments shown in the drawings.

Figure 1:
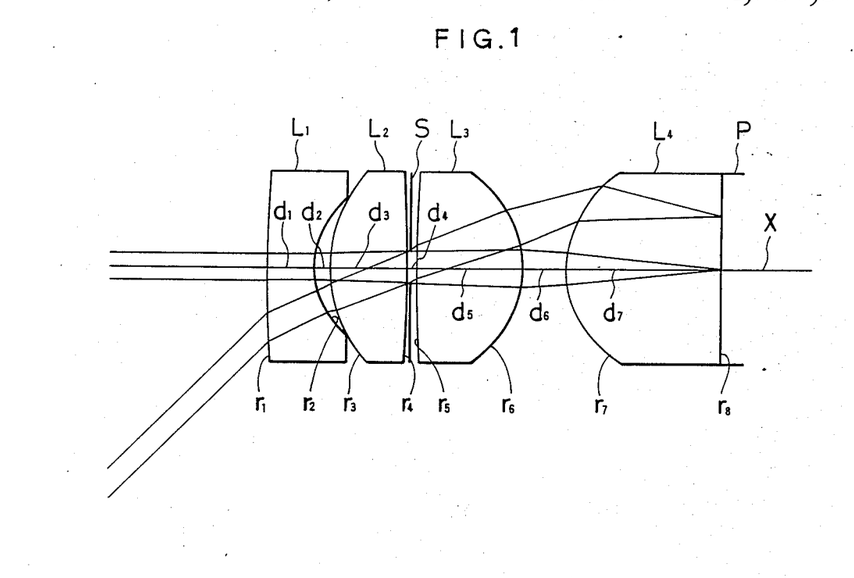
FIG. 1 is a schematic illustration of an endoscope objective lens construction in a first embodiment of the invention.

Referring first to FIG. 1, there is shown an embodiment of the endoscope objective lens construction according to the present invention, in which indicated at $L_1$ is a first lens, at $L_2$ a second lens, at $L_3$ a third lens and at $L_4$ a fourth lens. These lenses $L_1$ to $L_4$ are juxtaposed successively from the object side. The first lens $L_1$ is constituted by a negative lens with a thickness $d_1$, having a convex surface $r_1$ disposed on the object side and a concave surface $r_2$ on the image side. This first lens $L_1$ normally serves also as a cover glass. The second lens $L_2$ which is positioned at a distance of $d_2$ from the first lens $L_1$ is constituted by a plano-convex positive lens with a thickness $d_3$, having a convex surface $r_3$ disposed on the object side and a plane surface $r_4$ on the image side. The third lens $L_3$ which is positioned at a distance of $d_4$ from the second lens $L_2$ is constituted by a plano-convex positive lens with a thickness of $d_5$, having a plane surface $r_5$ disposed on the object side and a convex surface $r_6$ on the image side. The fourth lens which is positioned at a distance of $d_6$ from the third lens $L_3$ is constituted by a plano-convex positive lens with a thickness $d_7$, having a convex surface $r_7$ disposed on the object side and a plane surface $r_8$ on the image side. A stop S is interposed between the second and third lenses $L_2$ and $L_3$.

The lens system of the above construction has its imaging plane on the image-side surface $r_8$ of the fourth lens $L_4$, which is bonded or joined to the incident end of an image guide P which consists of a bundle of optical fiber for transfer of optical images of the object under observation or to the light receiving surface of a solid image pick-up element such as CCD or the like. Therefore, the back focal length of the lens system (Bf) is zero. The adjustment of the focus of the lens system with zero back focus like this can be effected by shifting the fourth lens $L_4$ together with the image guide P along the optical axis in such a manner as to vary the distance $d_6$ between the third and fourth lenses $L_3$ and $L_4$.

In this instance, assuming that the refractive indices and Abbe's numbers of the lenses $L_1$ to $L_4$ are $n_1$, $n_3$, $n_5$ and $n_7$ and $\gamma_1$, $\gamma_3$, $\gamma_5$ and $\gamma_7$, respectively, the thickness at the center of the first lens $L_1$ is $d_1$, the airspace between the first and second lenses $L_1$ and $L_2$ is $d_2$, the radius of curvature of the object-side surface of the fourth lens $L_4$ is $r_7$, the resultant focal length of the system as a whole is f, and the angle of view is $2\omega$, the lenses $L_1$ to $L_4$ should meet the following conditions.

(1) $n_1 > 1.70$  $\nu_1 > 40.0$
(2) $\nu_3 < 42.5$
(3) $n_5 > 1.60$  $\nu_5 > 50.0$
(4) $n_7 > 1.60$  $\nu_7 > 50.0$

These conditions concern the properties of the material of the first to fourth lenses $L_1$ to $L_4$ and have to be satisfied to correct the lateral chromatic aberration satisfactorily. Namely, if the condition (1) is not satisfied, the lens power (the inverse number of the focal length) of the first lens $L_1$ becomes insufficient, making it difficult to secure a wide view angle. A failure of complying with the condition (2) concerning the second lens $L_2$, which plays an important role for the correction of the chromatic aberration together with the first lens $L_1$, will be reflected by unsatisfactory correction of the chromatic aberration.

Further, where the third and fourth lenses $L_3$ and $L_4$ fail to satisfy the conditions (3) and (4), the Petzval's sum is deteriorated, resulting in insufficient correction of field curvature and a difficulty in correcting the chromatic aberration. In order to obtain the same lens power without complying with these conditions, the radii of curvature of the third and fourth lenses $L_3$ and $L_4$ have to be minimized to such an extent as will render the polishing and machining of lenses utterly difficult.

In addition to the above-defined conditions (1) to (4), the lens system is preferred to satisfy the following conditions.

(5) $d_1 + d_2 + d_3 < 2.5f$ (6) $2f < r_7/(n_7 - 1.0) < 3f$

The condition (5) defines the center thicknesses of and the airspace between the first and second lenses $L_1$ and $L_2$. Incompliance to this condition will result in an increased outer diameter of the first lens (front lens) $L_1$, which is a factor acting negatively to the intended reduction in diameter of the endoscope.

The condition (6) defines the lens power of the fourth lens $L_4$ for correcting the field curvature satisfactorily. If greater than the upper limit of the condition (6), the field curvature will be corrected to an excessive degree. On the other hand, if smaller than the lower limit of the condition (6), the correction will become deficient.

Figure 2:
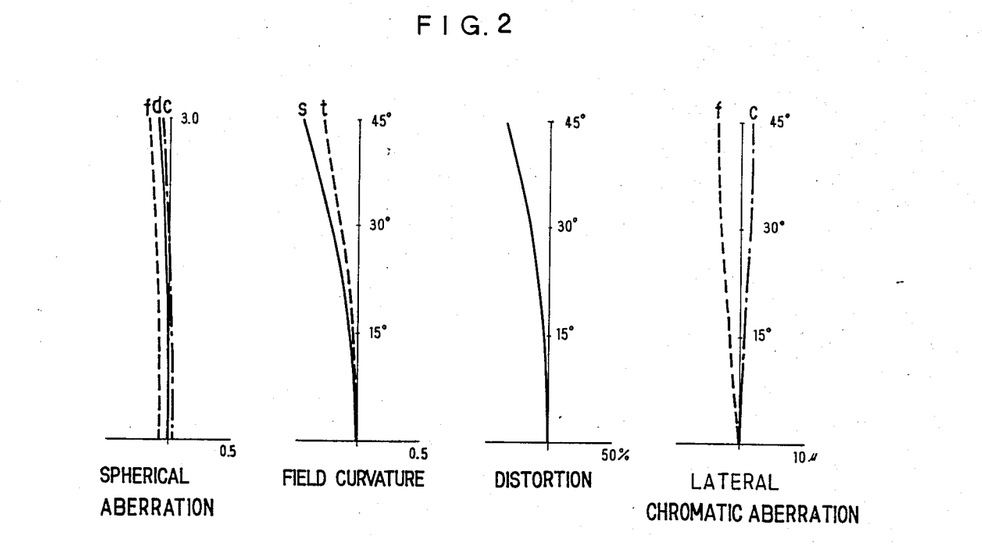
FIG. 2 shows aberration curve diagrams of the lens construction of FIG. 1.

In this regard, as a result of measurements of various aberrations, a lens system with the first to fourth lenses $L_1$ to $L_4$ arranged in compliance with the numerical data and the conditions in Table 1 below was proved to have aberration characteristics as shown in FIG. 2. As clear therefrom, the whole aberrations including the lateral chromatic aberration were corrected favorably, achieving an improved resolution.

TABLE 1

| m | r | d | n | ν |
|---|---|---|---|---|
| 1 | 7.505 | 0.296 | 1.72916 | 54.8 |
| 2 | 0.548 | 0.099 | | |
| 3 | 0.921 | 0.494 | 1.66755 | 41.9 |
| 4 | 11.727 | 0.066 | | |
| 5 | −11.727 | 0.657 | 11.72916 | 54.8 |
| 6 | −0.714 | 0.281 | | |
| 7 | 0.691 | 0.968 | 1.60738 | 56.7 |
| 8 | ∞ | | | |

Figure 3:
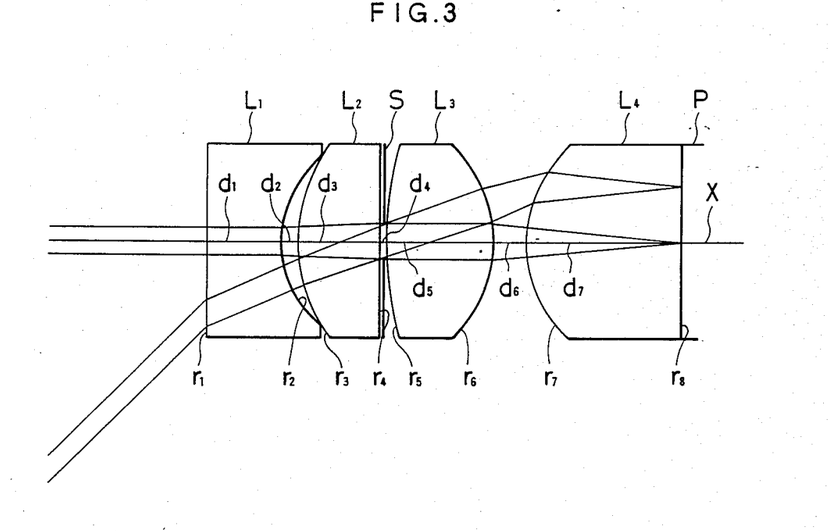
FIG. 3 is a schematic illustration of an objective lens construction in a second embodiment of the invention.
Figure 4:
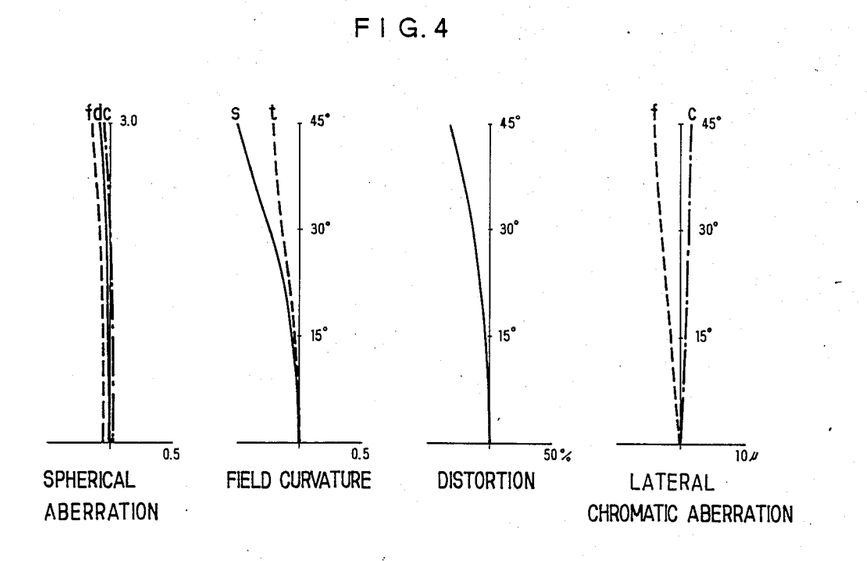
FIG. 4 shows aberration curve diagrams of the lens construction of FIG. 3.

$f = 0.5$  $Bf = 0$
angle of view $2\omega = 90°$
$d_1 + d_2 + d_3 = 1.778f$
$r_7/(n_7 - 1.0) = 2.275f$ Turning now to FIG. 3, there is shown a lens construction in a second embodiment of the invention, which differs from the embodiment of FIG. 1 in that the first lens $L_1$ has a plane surface $r_1$ on the object side and the third lens $L_3$ has on the object side a concave surface $r_5$ which has a greater radius of curvature than its image-side surface $r_6$. In case of a lens system having the respective lenses $L_1$ to $L_4$ arranged in compliance with the numerical data and the conditions of Table 2 below, there can be obtained a sufficiently high resolution with aberration characteristics as shown in FIG. 4.

TABLE 2

| m | r | d | n | ν |
|---|---|---|---|---|
| 1 | ∞ | 0.478 | 1.81550 | 44.4 |
| 2 | 0.686 | 0.106 | | |
| 3 | 1.006 | 0.528 | 1.60342 | 38.0 |
| 4 | ∞ | 0.032 | | |
| 5 | 2.346 | 0.686 | 1.69680 | 55.6 |
| 6 | −0.822 | 0.211 | | |
| 7 | 0.822 | 0.970 | 1.69680 | 55.6 |
| 8 | ∞ | | | |

Figure 5:
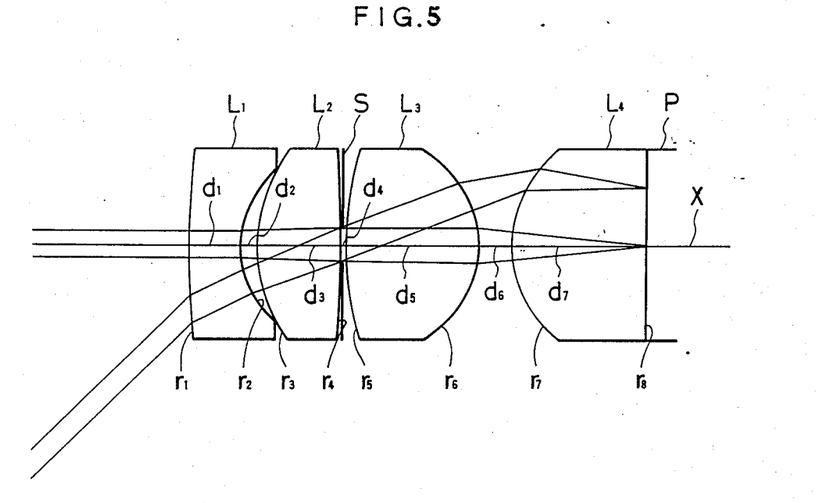
FIG. 5 is a schematic illustration of an objective lens construction in a third embodiment of the invention.
Figure 6:
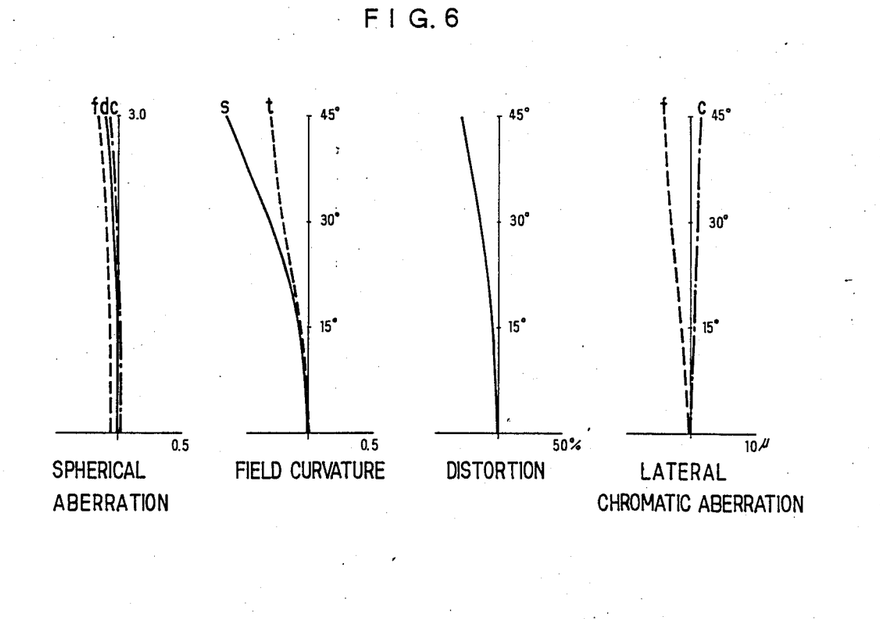
FIG. 6 shows aberration curve diagrams of the lens construction of FIG. 5.

$f = 0.5$  $Bf = 0$
angle of view $2\omega = 90°$
$d_1 + d_2 + d_3 = 2.225f$
$r_7/(n_7 - 1.0) = 2.359f$ Referring now to FIG. 5, there is shown a third embodiment of the invention, in which the first and third lenses $L_1$ and $L_3$ have convex surfaces $r_1$ and $r_5$, respectively, on the object side. The aberration characteristics of FIG. 6 are obtained when the lenses $L_1$ to $L_4$ are arranged as in Table 3 below.

TABLE 3

| m | r | d | n | ν |
|---|---|---|---|---|
| 1 | 9.027 | 0.316 | 1.73500 | 49.5 |
| 2 | 0.619 | 0.105 | | |
| 3 | 1.033 | 0.526 | 1.62004 | 36.3 |
| 4 | −13.136 | 0.032 | | |
| 5 | 1.971 | 0.842 | 1.62041 | 60.3 |
| 6 | −0.689 | 0.847 | | |
| 7 | 0.752 | 0.847 | 1.62041 | 60.3 |
| 8 | ∞ | | | |

TABLE 3-continued

| m | r | d | n | ν |
|---|---|---|---|---|

Figure 7:
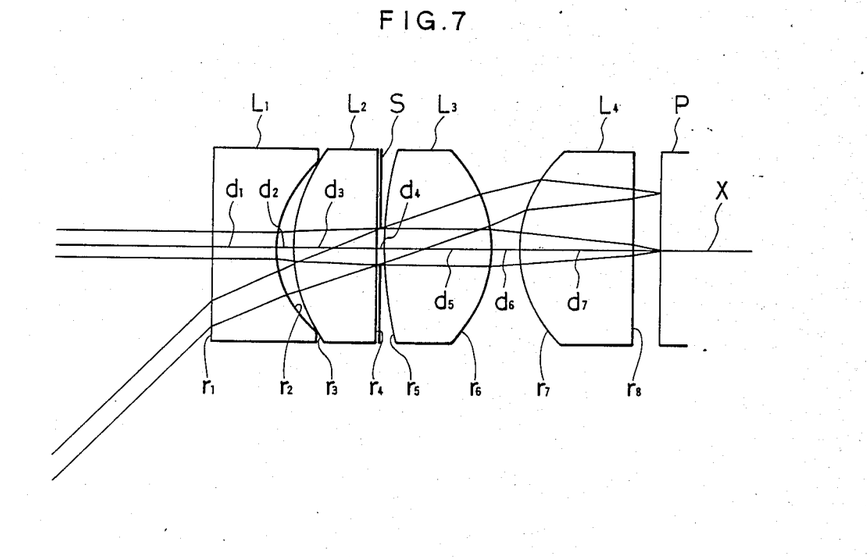
FIG. 7 is a schematic illustration of an objective lens construction in a fourth embodiment of the invention.

$f = 0.5$  $Bf = 0$
angle of view $2\omega = 90°$
$d_1 + d_2 + d_3 = 1.894f$
$r_7/(n_7 - 1.0) = 2.424f$ Further, shown in FIG. 7 is a fourth embodiment of the invention, which is similar to the second embodiment of FIG. 3 in shape of the lens system itself but which has an image plane P at a position spaced from the fourth lens $L_4$. With this construction, it is possible to insert a protective glass sheet, filter or the like between the fourth lens $L_4$ and the image plane P at which the incident end of an image guide or the light receiving surface of a solid image pick-up element is located. In this case, the adjustment of focus of the optical system can be effected by adjusting the distance between the fourth lens $L_4$ and the image plane. Namely, for this purpose, either the fourth lens $L_4$ is shifted in the direction of the optical axis relative to a fixed image plane which is formed by an image guide or a solid image pick-up element, or the image guide or solid image pick-up element is moved relative to the fourth lens $L_4$ which is fixedly held in a predetermined position. Alternatively, both of them may be moved relative to each other if desired. The aberration characteristics shown in FIG. 8 can be obtained by arranging the lenses $L_1$ to $L_4$ as in Table 4 below.

TABLE 4

Figure 8:
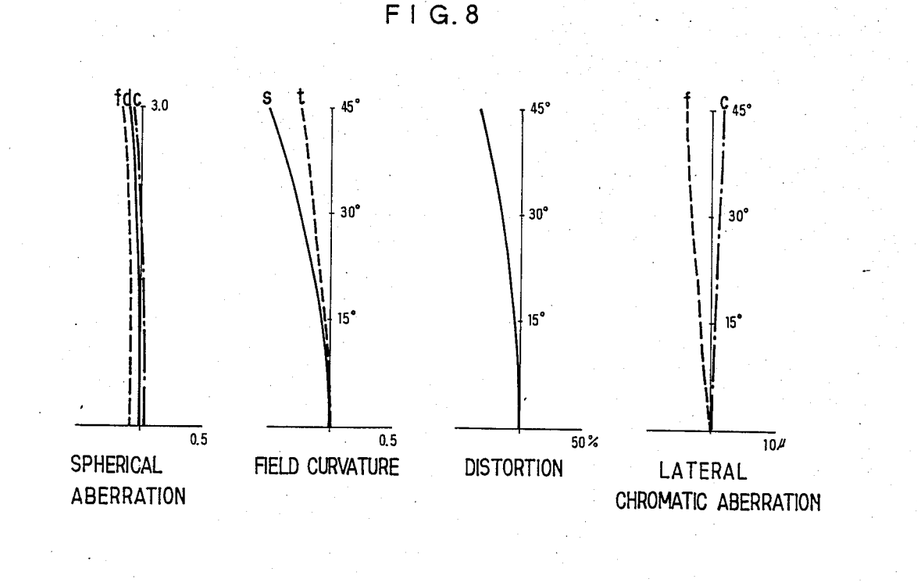
FIG. 8 shows aberration curve diagrams of the lens construction of FIG. 7.

| m | r | d | n | ν |
|---|---|---|---|---|
| 1 | ∞ | 0.400 | 1.81550 | 44.4 |
| 2 | 0.695 | 0.107 | | |
| 3 | 1.020 | 0.535 | 1.60342 | 38.0 |
| 4 | ∞ | 0.032 | | |
| 5 | 2.378 | 0.695 | 1.69680 | 56.6 |
| 6 | −0.833 | 0.182 | | |
| 7 | 0.833 | 0.710 | 1.69680 | 55.6 |
| 8 | ∞ | | | |

Figure 9:
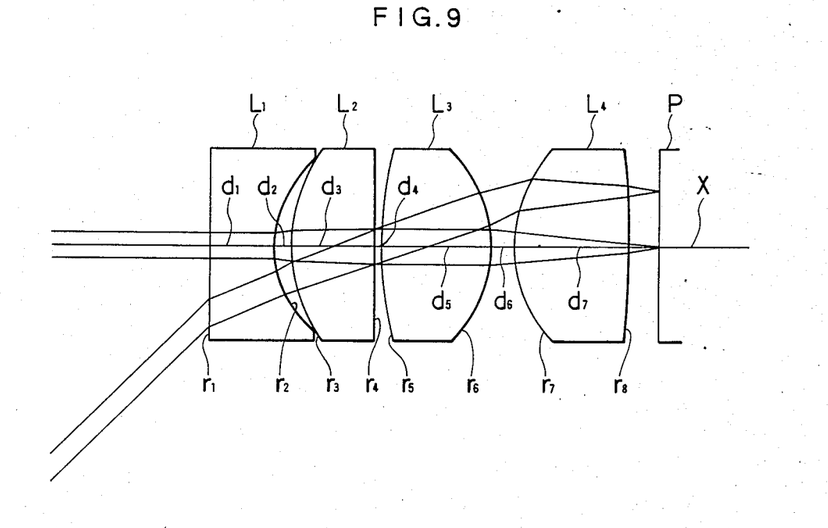
FIG. 9 is a schematic illustration of an objective lens construction in a fifth embodiment of the invention.

$f = 0.5$  $Bf = 0.170$
angle of view $2\omega = 90°$
$d_1 + d_2 + d_3 = 2.084f$
$r_7/(n_7 - 1.0) = 2.391f$ Further, shown in FIG. 9 is a fifth embodiment of the invention, in which the fourth lens $L_4$ has a convex surface $r_8$ on the image side. In this case, the aberration characteristics shown in FIG. 10 can be obtained by arranging the system as in Table 5 below.

TABLE 5

Figure 10:
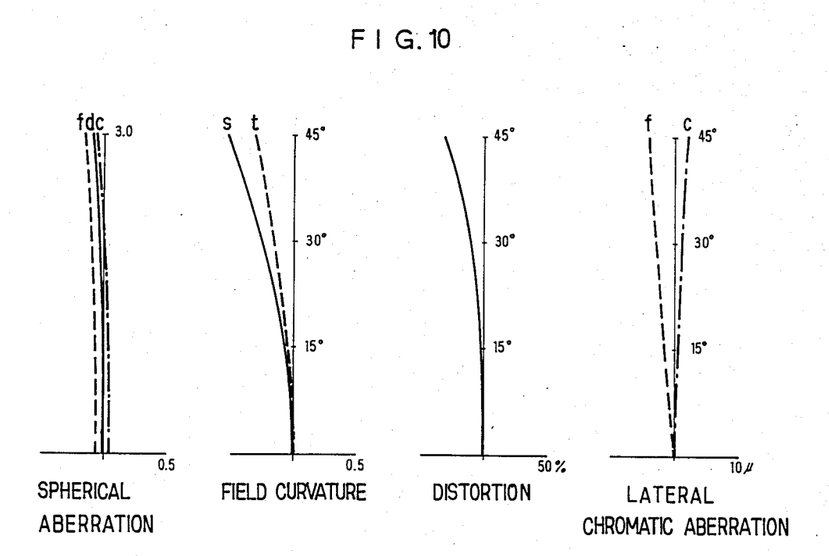
FIG. 10 shows aberration curve diagrams of the lens construction of FIG. 9.

| m | r | d | n | ν |
|---|---|---|---|---|
| 1 | ∞ | 0.403 | 1.81550 | 44.4 |
| 2 | 0.700 | 0.108 | | |
| 3 | 1.026 | 0.539 | 1.60342 | 38.0 |
| 4 | ∞ | 0.032 | | |
| 5 | 2.394 | 0.700 | 1.69680 | 55.6 |
| 6 | −0.839 | 0.151 | | |
| 7 | 0.886 | 0.714 | 1.69680 | 55.6 |
| 8 | −6.829 | | | |

$f = 0.5$  $Bf = 0.192$
angle of view $2\omega = 90°$
$d_1 + d_2 + d_3 = 2.100f$
$r_7/(n_7 - 1.0 = 2.543f$

What is claimed is:

1. An objective lens for an endoscope, having a lens system consisting of four single lenses designated as first lens $L_1$, second lens $L_2$, third lens $L_3$ and fourth lens $L_4$ from the object side, wherein:

said first lens $L_1$ consists of a negative lens having a concave surface on the image side;

said second lens $L_2$ consists of a positive lens having a surface of a smaller radius of curvature on the object side;

said third lens $L_3$ consists of a positive lens having a surface of a smaller radius of curvature on the image side; and said fourth lens $L_4$ consists of a positive lens;

said first to fourth lenses $L_1$ to $L_4$ of said lens system being arranged to satisfy the following conditions (1) to (4).

$$n_1 > 1.70, \nu_1 > 40.0, \quad (1)$$

$$\nu_3 < 42.5, \quad (2)$$

$$n_5 > 1.60, \nu_5 > 50.0, \text{ and} \quad (3)$$

$$n_7 > 1.60, \nu_7 > 50.0 \quad (4)$$

where $n_1$, $n_5$ and $n_7$ are refractive indices of said first lens $L_1$, third lens $L_3$ and fourth lens $L_4$ relative to line d, and $\gamma_1$, $\gamma_3$, $\gamma_5$ and $V_7$ are Abbe's numbers of said first lens $L_1$, second lens $L_2$, third lens $L_3$ and fourth lens $L_4$, respectively.

2. An objective lens as defined in claim 1, wherein said first to fourth lenses $L_1$ to $L_4$ are arranged to satisfy further the following conditions (5) and (6):

$$(5) \; d_1+d_2+d_3<2.5f, \text{ and}$$

$$(6) \; 2f<r_7/(n_7-1.0)<3f$$

where $d_1$ is the center thickness of said first lens $L_1$, $d_2$ is the airspace between said first and second lenses $L_1$ and $L_2$, $d_3$ is the center thickness of said second lens $L_2$, f is the resultant focal length of said system, and $r_7$ is the radius of curvature of the object-side surface of said fourth lens $L_4$.

3. An objective lens as defined in claim 1, further comprising a stop interposed between said second and third lenses $L_2$ and $L_3$.

4. An objective lens as defined in claim 1, wherein said lens system has the image plane thereof located to coincide with the image-side surface of said fourth lens $L_4$.

5. An objective lens as defined in claim 4, wherein said the focus of said lens system is adjusted by shifting said fourth lens $L_4$ in the direction of the optical axis.

6. An objective lens as defined in claim 1, wherein said lens system is arranged to have an imaging position located rearward of said fourth lens $L_4$.

7. An objective lens as defined in claim 5, wherein the focus of said lens system is adjusted by varying the distance between said fourth lens $L_4$ and said image plane.

* * * * *

UNITED STATES PATENT AND TRADEMARK OFFICE
CERTIFICATE OF CORRECTION

PATENT NO. : 4,984,878

DATED : January 15, 1991

INVENTOR(S) : Hitoshi Miyano

It is certified that error appears in the above-identified patent and that said Letters Patent is hereby corrected as shown below:

On the title page, item [54] lines 1, and in column 1, line 1, the title should read --OBJECTIVE LENS FOR ENDOSCOPE--.

Signed and Sealed this

Eighth Day of September, 1992

Attest:

DOUGLAS B. COMER

*Attesting Officer*  *Acting Commissioner of Patents and Trademarks*